United States Patent
Potel et al.

(10) Patent No.: US 9,702,301 B2
(45) Date of Patent: Jul. 11, 2017

(54) FUEL CIRCUIT FOR AN AVIATION TURBINE ENGINE, THE CIRCUIT HAVING A FUEL PRESSURE REGULATOR VALVE

(75) Inventors: Nicolas Potel, Maisons Alfort (FR); Sebastien Gameiro, Paris (FR)

(73) Assignee: SNECMA, Paris (FR)

( * ) Notice: Subject to any disclaimer, the term of this patent is extended or adjusted under 35 U.S.C. 154(b) by 210 days.

(21) Appl. No.: 13/978,470

(22) PCT Filed: Jan. 4, 2012

(86) PCT No.: PCT/FR2012/050019
§ 371 (c)(1),
(2), (4) Date: Jul. 5, 2013

(87) PCT Pub. No.: WO2012/093235
PCT Pub. Date: Jul. 12, 2012

(65) Prior Publication Data
US 2013/0283811 A1 Oct. 31, 2013

(30) Foreign Application Priority Data
Jan. 6, 2011 (FR) ...................................... 11 50094

(51) Int. Cl.
*F02C 7/22* (2006.01)
*F02C 9/26* (2006.01)
(Continued)

(52) U.S. Cl.
CPC ................ *F02C 7/22* (2013.01); *F02C 7/224* (2013.01); *F02C 9/26* (2013.01); *F02C 7/222* (2013.01);
(Continued)

(58) Field of Classification Search
CPC .. F02C 7/22; F02C 7/232; F02C 7/236; F02C 9/263; F02C 9/26; F02C 9/28; F02C 9/30; F02C 9/36
(Continued)

(56) References Cited

U.S. PATENT DOCUMENTS 2,916,875 A * 12/1959 Morley .................... F02C 7/224
60/39.08
3,908,360 A * 9/1975 Meyer ..................... F02C 7/236
60/39.281
(Continued)

FOREIGN PATENT DOCUMENTS

| EP | 1 018 598 | 7/2000 |
|---|---|---|
| EP | 1 020 637 | 7/2000 |

(Continued)

OTHER PUBLICATIONS

International Search Report Issued May 15, 2012 in PCT/FR12/050019 Filed Jan. 4, 2012.

*Primary Examiner* — Pascal M Bui Pho
*Assistant Examiner* — Eric Linderman
(74) *Attorney, Agent, or Firm* — Oblon, McClelland, Maier & Neustadt, L.L.P.

(57) ABSTRACT

A fuel circuit for an aviation turbine engine, the fuel circuit including: a main fuel line for feeding fuel to a combustion chamber of the engine and including a positive displacement pump; an auxiliary fuel line connected to the main fuel line at a junction situated downstream from the pump and serving to feed fuel to hydraulic actuators to control variable-geometry equipment of the engine, the auxiliary fuel line including electrohydraulic servo-valves upstream from each actuator; and a fuel pressure regulator valve arranged on the main fuel line downstream from the pump.

6 Claims, 1 Drawing Sheet

(51) Int. Cl.
*F02C 9/28* (2006.01)
*F02C 7/224* (2006.01)
*F02C 7/236* (2006.01)

(52) U.S. Cl.
CPC .............. *F02C 7/236* (2013.01); *F02C 9/263* (2013.01); *F02C 9/28* (2013.01); *F05D 2260/406* (2013.01); *F05D 2270/303* (2013.01)

(58) Field of Classification Search
USPC ............................................... 60/734, 39.281
See application file for complete search history.

(56) References Cited

U.S. PATENT DOCUMENTS

| | | | | |
|---|---|---|---|---|
| 4,607,486 | A * | 8/1986 | Cole | F02C 7/236 417/203 |
| 4,915,593 | A * | 4/1990 | Cygnor | F02C 7/236 417/245 |
| 4,987,737 | A * | 1/1991 | Cantwell | F01D 21/02 60/39.281 |
| 5,116,362 | A * | 5/1992 | Arline | F02C 7/236 417/203 |
| 5,159,808 | A * | 11/1992 | Kast | F02C 7/236 60/39.091 |
| 5,168,704 | A * | 12/1992 | Kast | F02C 9/48 60/420 |
| 6,135,135 | A * | 10/2000 | Futa, Jr. | F02C 7/232 137/115.03 |
| 6,251,270 | B1 | 6/2001 | Blot-Carretero et al. | |
| 6,446,437 | B1 | 9/2002 | Smith | |
| 6,487,847 | B1 * | 12/2002 | Snow | F02C 7/236 60/235 |
| 6,810,671 | B2 * | 11/2004 | Hansen | F02C 7/22 417/244 |
| 9,316,157 | B2 * | 4/2016 | Ripley | F02C 7/32 |
| 2002/0007820 | A1 * | 1/2002 | Davies et al. | F02C 7/232 123/459 |
| 2002/0184885 | A1 * | 12/2002 | Blot-Carretero | F02C 7/232 60/776 |
| 2003/0136103 | A1 * | 7/2003 | Reuter et al. | 60/39.08 |
| 2004/0011052 | A1 | 1/2004 | Clements | |
| 2007/0130911 | A1 * | 6/2007 | Goldberg et al. | 60/39.281 |
| 2008/0271456 | A1 * | 11/2008 | Scully | F02C 7/228 60/740 |
| 2009/0094974 | A1 * | 4/2009 | Galozio | F02C 7/232 60/433 |
| 2009/0235631 | A1 | 9/2009 | Bocquet et al. | |
| 2010/0037961 | A1 * | 2/2010 | Tysver et al. | 137/115.13 |
| 2010/0089026 | A1 * | 4/2010 | Baker | F02C 7/236 60/39.281 |
| 2010/0293919 | A1 * | 11/2010 | Poisson | F01D 19/00 60/39.281 |
| 2011/0139123 | A1 * | 6/2011 | Brocard et al. | 123/458 |
| 2011/0146288 | A1 * | 6/2011 | Byrd | F02C 9/26 60/772 |
| 2012/0090331 | A1 * | 4/2012 | Bilton et al. | 60/776 |
| 2012/0204532 | A1 | 8/2012 | Potel et al. | |
| 2012/0260658 | A1 | 10/2012 | Bader et al. | |
| 2012/0266600 | A1 * | 10/2012 | Bader | F02C 7/236 60/734 |
| 2013/0036738 | A1 * | 2/2013 | Pora | F02C 7/236 60/734 |
| 2013/0192244 | A1 * | 8/2013 | Ripley | F02C 7/236 60/776 |
| 2013/0192679 | A1 * | 8/2013 | Ripley | F02C 7/236 137/2 |
| 2013/0327044 | A1 * | 12/2013 | Portolese | F02C 7/232 60/734 |
| 2014/0023525 | A1 * | 1/2014 | Potel | F02C 7/232 417/205 |
| 2014/0174409 | A1 * | 6/2014 | Ripley | F02M 39/02 123/506 |
| 2015/0192073 | A1 * | 7/2015 | Griffiths | F02C 7/22 60/734 |
| 2015/0337736 | A1 * | 11/2015 | Vertenoeuil | F02C 7/236 60/734 |
| 2016/0076452 | A1 * | 3/2016 | Striker | F02C 7/236 60/734 |
| 2016/0281656 | A1 * | 9/2016 | Alecu | F02M 31/16 |

FOREIGN PATENT DOCUMENTS

| | | | |
|---|---|---|---|
| EP | 1 329 617 | 7/2003 | |
| FR | 2 925 594 | 6/2009 | |
| FR | 2 935 749 | 3/2010 | |
| FR | 2935749 A1 * | 3/2010 | ............ F01D 17/26 |

\* cited by examiner

FUEL CIRCUIT FOR AN AVIATION TURBINE ENGINE, THE CIRCUIT HAVING A FUEL PRESSURE REGULATOR VALVE

BACKGROUND OF THE INVENTION

The present invention relates to the general field of fuel flow in a turbine engine. The invention applies to any type of aviation turbine engine, and more particularly to airplane turbojets.

In an aeroengine, it is common practice for fuel to be used not only for burning in the combustion chamber of the engine, but also as a hydraulic fluid in hydraulic actuators for controlling pieces of variable-geometry equipment of the engine (such as air bleak valves, and valves enabling the geometry of the compressor of the turbine engine to be adapted).

For this purpose, the fuel circuit of a turbine engine typically comprises a main fuel line for feeding the combustion chamber of the engine with fuel, and an auxiliary fuel line connected to the main fuel line and serving to feed fuel to the hydraulic actuators in order to control pieces of variable-geometry equipment of the engine.

The auxiliary fuel line for feeding the hydraulic actuators includes electrohydraulic servo-valves, i.e. hydraulic valves that are controlled by servo-motors. These servo-valves serve to deliver a calibrated flow rate of fuel to one or the other of the chambers of a hydraulic actuator, and they are controlled by the electronic control unit (ECU) of the turbine engine.

It is known that servo-valves operate correctly providing the fuel is above a certain temperature. Unfortunately, in extremely cold weather, the temperature of the fuel fed to such servo-valves might be negative when the airplane is starting or taking off, and that runs the risk of the ducts of the servo-valves becoming clogged.

One of the certification requirements to which engine manufacturers are subjected thus requires systems to operate properly under extremely cold conditions (e.g. "icing" conditions). This implies that, in order to protect sensitive elements such as servo-valves, the temperature inside the ducts of the servo-valves must be greater than the point at which water dissolved in the fuel freezes.

In order to comply with such certification, it is known to place an oil or air heat exchanger upstream from the servo-valves in the auxiliary fuel circuit in order to heat the fuel entering the servo-valves and thus avoid any risk of their ducts clogging with ice formed by the water contained in the ice-cold fuel. With an oil heat exchanger, heat from the oil circuit of the engine is used for heating the fuel entering the servo-valves by heat transfer. With an air heat exchanger, the heat exchanger is located upstream from the low pressure pump and it is air taken from the compressor or the fan of the engine that is used for heating all of the fuel.

The use of an oil or air heat exchanger for heating fuel on entry into servo-valves nevertheless leads to numerous drawbacks. In particular, an oil heat exchanger is relatively heavy, there is a risk of fuel leaking into the oil, and there are hydraulic constraints in the oil circuit. With an air heat exchanger, drawbacks such as heavy weight, large size, and difficulty of installation and control are likewise present.

OBJECT AND SUMMARY OF THE INVENTION

A main object of the present invention is thus to mitigate such drawbacks by proposing a fuel circuit that makes it possible, under extremely cold conditions, to increase the temperature of the fuel on entry to servo-valves in simplified and effective manner.

This object is achieved by a fuel circuit for an aviation turbine engine, the circuit comprising: a main fuel line for feeding fuel to a combustion chamber of the engine and including a positive displacement pump; and an auxiliary fuel line connected to the main fuel line at a junction situated downstream from the pump and serving to feed fuel to hydraulic actuators in order to control variable-geometry equipment of the engine, the auxiliary fuel line having electrohydraulic servo-valves upstream from each actuator, the circuit further comprising, in accordance with the invention, a fuel pressure regulator valve arranged on the main fuel line downstream from the pump.

Under extremely cold conditions, the fuel pressure regulator valve is controlled so as to be partially closed, thereby having the consequence of increasing the temperature of the fuel downstream therefrom, and more particularly at the entry to the servo-valves of the auxiliary fuel line for feeding the hydraulic actuators for controlling variable-geometry equipment.

The reasons for such a temperature rise of the fuel are as follows. Partially closing the regulator valve (i.e. constricting its fuel-passing section) leads to an increase in the pressure difference between the inlet and the outlet of the pump in the main fuel line. As a result of this partial closure, the pressure at the inlet of the pump remains unchanged while the pressure at its outlet increases because of the increase in head losses to which the fuel is subjected downstream from the pump (the head losses due to the presence of the regulator valve are greater when the valve is partially closed than when it is fully open). For constant fuel flow rate, this pressure difference across the terminals of the pump gives rise to an increase in the amount of mechanical power drawn by the pump and thus to an increase in the hydraulic power delivered by the pump to the fuel at its outlet. This hydraulic power delivered to the fuel is then dissipated as heat by throttling in the fuel circuit as a result of the head losses to which the fuel is subjected on passing through the regulator valve. This leads to a rise in the temperature of the fuel at the outlet from the regulator valve. For example, a pressure rise of 40 bars at the outlet from the pump makes it possible to increase the temperature of the fuel by 8° C. on starting under extremely cold conditions compared with a circuit architecture that does not include a device dedicated to providing protection against icing in the fuel.

Thus, the presence of the regulator valve in the fuel circuit makes it possible, if necessary, to increase the temperature of the fuel at the inlet to the servo-valves of the circuit and thus avoid ice forming. Having recourse to such a regulator valve constitutes little additional weight and occupies little space (the valve may be directly incorporated in the pump). Such a valve also presents simplified operation.

The regulator valve may be connected to an electronic control unit of the engine that controls its opening and closing. Under such circumstances, the electronic control unit of the engine may be connected to a fuel temperature sensor arranged downstream from the pump.

Alternatively, the regulator valve may be connected to a thermostatic valve that controls its opening and closing, said thermostatic valve being arranged in a fuel extractor pipe connecting the regulator valve to the auxiliary fuel line upstream from the servo-valves.

The main fuel line need not have head loss equipment between the pump and the regulator valve. Head loss equipment is used to mean, for example, a filter, a heat exchanger, or any other piece of equipment arranged on the fuel line and subjecting fuel passing therethrough to heat losses.

The invention also provides an aviation turbine engine having a fuel circuit as defined above.

The invention also provides a method of controlling a fuel pressure regulator valve in a fuel circuit as defined above, the method consisting in closing the regulator valve partially when the temperature of the fuel in the auxiliary fuel line upstream from the servo-valves is lower than a predetermined threshold temperature, and in opening the regulator valve when the temperature of the fuel in the auxiliary fuel line upstream from the servo-valves is higher than the predetermined threshold temperature.

BRIEF DESCRIPTION OF THE DRAWINGS

Other characteristics and advantages of the present invention appear from the following description made with reference to the accompanying drawings that show embodiments having no limiting character. In the figures.

DETAILED DESCRIPTION OF EMBODIMENTS

Figure 1:
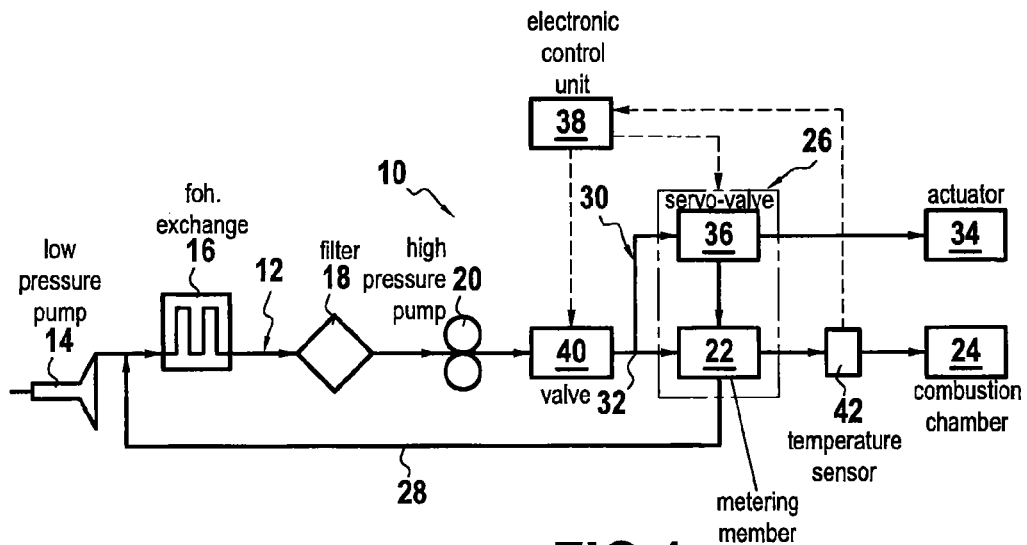
FIG. 1 is a highly diagrammatic representation of a fuel circuit of the invention for an aviation turbine engine.

With reference to FIG. 1, the fuel circuit 10 for an aviation turbine engine comprises main fuel line 12 that is fitted in the fuel flow direction with a low pressure pump 14, a fuel/oil heat exchanger 16, a main fuel filter 18, and a so-called "high pressure" positive displacement pump 20. Naturally, a different arrangement of the equipment could be envisaged.

The upstream side of the low pressure pump 14 is connected to the fuel tank of the airplane (not shown in FIG. 1). The fuel/oil heat exchanger 16 serves to cool the oil for lubricating the engine by exchanging heat with the fuel via a heat exchange surface that separates these two fluids, and that also has the consequence of heating the fuel.

Downstream from the high pressure pump 20, the main fuel line 12 includes a metering member 22 for controlling the rate at which fuel is injected into the combustion chamber 24 of the engine via fuel injection systems (not shown). The fuel metering member 22 is controlled by the hydromechanical unit (HMU) 26 of the engine.

Excess fuel in the main line is returned to upstream of the fuel/oil heat exchanger 16 via a fuel return loop 28.

The fuel circuit also has an auxiliary fuel line 30 connected to the main fuel line 12 at a junction 32 situated downstream from the high pressure pump 20. This auxiliary line is for feeding fuel to hydraulic actuators 34 (e.g. piston-and-cylinder type actuators) for controlling variable-geometry pieces of equipment of the engine (not shown).

More precisely, this auxiliary fuel line includes electro-hydraulic servo-valves 36 of well-known type, each servo-valve being used for delivering a flow of fuel to one or the other of the chambers of a hydraulic actuator 34.

These servo-valves 36 are electrically controlled by the ECU 38 of the engine. The fuel leaving the servo-valves rejoins the fuel return loop 28 by passing through the metering member 22.

In the invention, the fuel circuit also has a fuel pressure regulator valve 40 that is arranged on the main fuel line 12 downstream from the high pressure pump 20.

Figure 2:
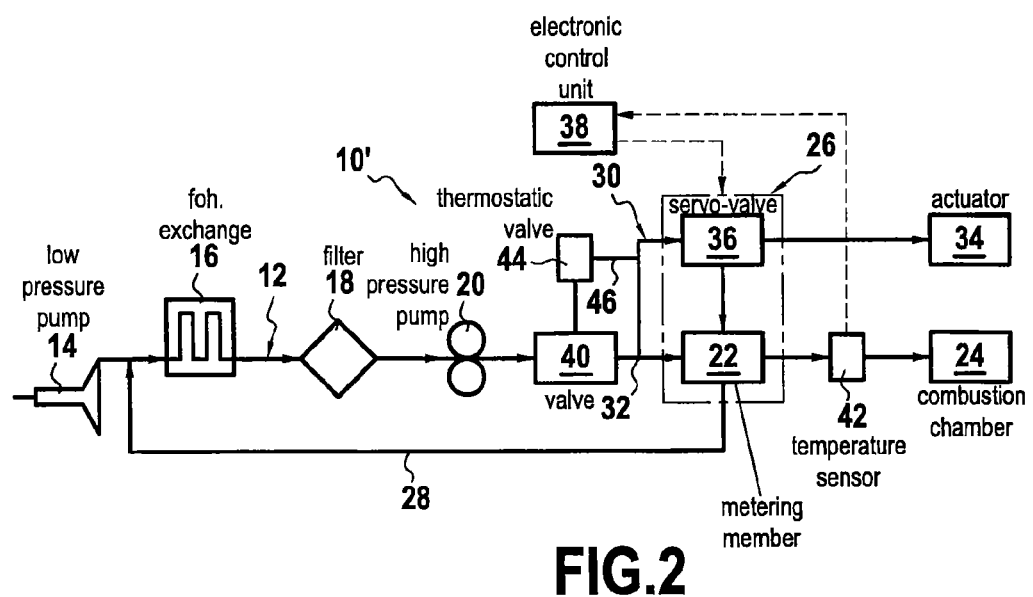
FIG. 2 is a highly diagrammatic representation of a portion of the fuel circuit in a variant embodiment of the invention.

It should be observed that the regulator valve 40 could be placed anywhere along the main fuel line downstream from the high pressure pump 20 and upstream from the combustion chamber 24, e.g. upstream from the junction 32 between the main fuel line and the auxiliary fuel line 30, as shown in FIGS. 1 and 2.

The function of this regulator valve 40 is to regulate the pressure of the fuel passing therethrough by acting on the flow section for the fuel passing through. By way of example it may be a small solenoid valve associated with a slide valve having a rating spring.

In the embodiment of FIG. 1, the regulator valve 40 is connected to the ECU 38 of the engine that acts electrically to open and close its fuel-passing section.

The regulator valve is opened and closed more specifically as a function of the temperature of the fuel in the fuel circuit downstream from the high pressure pump 20. For this purpose, the ECU is connected to a fuel temperature sensor 42 located in the main fuel line, e.g. downstream from the high pressure pump 20, and in particular at the outlet from the fuel meter 22.

Depending on the temperature of the fuel as determined by the sensor 42, the ECU of the engine may cause the regulator valve 40 to be closed in part or to be opened fully. Thus, when the temperature of the fuel becomes less than a predetermined threshold temperature (e.g. 10° C.), the ECU causes the regulator valve 40 to close in part, this partial closure ending up by causing the temperature of the fuel downstream from the regulator valve to rise and thus causing the temperature of the fuel at the inlets of the servo-valves 36 to rise. When the temperature of the fuel is higher than the predetermined threshold temperature, the ECU causes the regulator valve to open fully, and the presence of this valve then has no effect on the pressure (and thus the temperature) of the fuel downstream therefrom.

In practice, a temperature lower than the threshold temperature of 10° C. is reached only when the airplane is starting or taking off (and under extremely cold conditions). While the airplane is in other stages of flight, there is no longer any need to heat the fuel entering the servo-valves since the presence of the fuel/oil heat exchanger 16 situated further upstream in the fuel circuit together with the contribution of heat via the return loop 28 suffices to bring the fuel to a temperature higher than the threshold.

The increase in the temperature of the fuel at the outlet from the regulator valve 40 is due to an increase in the pressure difference between the inlet and the outlet of the high pressure pump 20, with this increase being generated by the constriction of the fuel-passing section through the valve as a result of it being partially closed.

For constant fuel flow rate, the increase in the pressure difference across the terminals of the high pressure pump gives rise to an increase in the mechanical power drawn by the pump and thus to an increase in the hydraulic power it delivers to the fuel at its outlet. This hydraulic power delivered to the fuel is dissipated thermally by the throttling in the fuel circuit as a result of the head losses to which the fuel is subjected on passing through the regulator valve 40. This leads to a rise in the temperature of the fuel at the outlet from this valve.

By way of example, a pressure increase of 40 bars at the outlet from the high pressure pump suffices to increase the temperature of the fuel by 8° C. on starting in extremely cold conditions compared with a circuit architecture that does not have a device dedicated to providing protection against icing in the fuel.

In another embodiment of the invention as shown in FIG. 2, the regulator valve 40 for regulating the pressure of the fuel in the fuel circuit 10' is connected to a thermostatic valve 44 that controls the opening and closing of its fuel-passing section. For example, the thermostatic valve is arranged in a fuel-taking pipe 46 connecting the regulator valve to the auxiliary fuel line 30 upstream from the servo-valves 36.

Thus, when the temperature of the fuel in the fuel-taking pipe becomes less than a predetermined threshold temperature (e.g. 10° C.), the thermostatic valve opens and causes the fuel-passing section of the regulator valve 40 to close in part. As mentioned above, this partial closure of the regulator valve ends up by causing a rise in the temperature of the fuel downstream from the regulator valve, and thus at the inlets of the servo-valves 36.

Likewise, when the temperature of the fuel in the fuel-taking pipe is higher than the predetermined threshold temperature, the thermostatic valve remains closed and the regulator valve remains fully open, so its presence no longer has any effect on the pressure (and thus the temperature) of the fuel downstream therefrom.

The invention claimed is:

1. A fuel circuit for an aviation turbine engine, the fuel circuit comprising:
   a main fuel line for feeding fuel in the main fuel line to a combustion chamber of the aviation turbine engine and including a positive displacement pump;
   an auxiliary fuel line connected to the main fuel line at a junction situated downstream from the positive displacement pump and serving to feed fuel in the auxiliary fuel line to hydraulic actuators to control variable-geometry equipment of the aviation turbine engine, the auxiliary fuel line including electrohydraulic servo-valves upstream from each hydraulic actuator;
   a fuel pressure regulator valve arranged on the main fuel line downstream from the positive displacement pump and upstream from the junction;
   a fuel metering member which controls a rate at which the fuel is injected into the combustion chamber, the fuel metering member being arranged on the main fuel line downstream from the junction;
   a hydromechanical unit which controls the fuel metering member;
   a return fuel loop through which excess fuel in the main fuel line passing through the fuel metering member and the fuel leaving the electrohydraulic servo-valves and passing through the fuel metering member is returned to the main fuel line upstream of the positive displacement pump;
   a temperature sensor arranged on the main fuel line downstream from the positive displacement pump: and
   an electronic control unit that controls opening and closing of the fuel pressure regulator valve as a function of temperature of the fuel in the circuit downstream from the positive displacement pump measured by the temperature sensor, such that a flow section for the fuel passing through the fuel pressure regulator valve and being fed to the fuel metering member and to the auxiliary fuel line is controlled by the electronic control unit,
   wherein the electronic control unit is configured to
   generate a constriction of a fuel-passing section through the fuel pressure regulator valve by partially closing the fuel pressure regulator valve when the temperature of the fuel measured by the temperature sensor is less than a predetermined threshold temperature in order to lead to a substantial increase in a fuel pressure in a part of the fuel circuit extending between the positive displacement pump and the fuel pressure regulator valve.

2. A circuit according to claim 1, wherein the main fuel line does not include head loss equipment between the positive displacement pump and the fuel pressure regulator valve.

3. An aviation turbine engine comprising the fuel circuit according to claim 1.

4. A method of controlling the fuel pressure regulator valve of the fuel circuit according to claim 1, the method comprising:
   closing the fuel pressure regulator valve partially when the temperature of the fuel measured by the temperature sensor is lower than the predetermined threshold temperature; and
   opening the fuel pressure regulator valve when the temperature of the fuel measured by the temperature sensor is higher than the predetermined threshold temperature.

5. A circuit according to claim 1, wherein the electronic control unit is configured to
   open the fuel pressure regulator valve when the temperature of the fuel measured by the temperature sensor is higher than the predetermined threshold temperature.

6. A fuel circuit for an aviation turbine engine, the fuel circuit comprising:
   a main fuel line for feeding fuel to a combustion chamber of the aviation turbine engine and including a positive displacement pump;
   an auxiliary fuel line connected to the main fuel line at a junction situated downstream from the positive displacement pump and serving to feed the fuel to hydraulic actuators to control variable-geometry equipment of the aviation turbine engine, the auxiliary fuel line including electrohydraulic servo-valves upstream from each hydraulic actuator;
   a fuel pressure regulator valve arranged on the main fuel line downstream from the positive displacement pump and upstream from the junction;
   a fuel metering member which controls a rate at which the fuel is injected into the combustion chamber, the fuel metering member being arranged on the main fuel line downstream from the junction;
   a hydromechanical unit which controls the fuel metering member; and
   a return fuel loop through which excess fuel in the main fuel line passing through the fuel metering member and the fuel leaving the electrohydraulic servo-valves and passing through the fuel metering member is returned to the main fuel line upstream of the positive displacement pump,
   wherein the fuel pressure regulator valve is connected to a thermostatic valve that controls said fuel pressure regulator valve opening and closing, the thermostatic valve being arranged in a fuel extractor pipe connecting the fuel pressure regulator valve to the auxiliary fuel line upstream from the electrohydraulic servo-valves, and the thermostatic valve generating a constriction of a fuel-passing section through the fuel pressure regulator valve by opening so as to partially close the fuel pressure regulator valve when the temperature of the fuel is less than a predetermined threshold temperature in order to lead to a substantial increase in the fuel pressure in a part of the fuel circuit extending between the positive displacement pump and the fuel pressure regulator valve.

* * * * *